Nov. 9, 1926.

S. T. BARKER

ENGINE

Filed Dec. 29, 1922    13 Sheets-Sheet 2

1,605,912

INVENTOR
SIMEON T. BARKER.

Nov. 9, 1926.

S. T. BARKER 1,605,912

ENGINE

Filed Dec. 29, 1922    13 Sheets-Sheet 3

WITNESSES

INVENTOR
SIMEON T. BARKER.
BY
ATTORNEYS

Nov. 9, 1926.

S. T. BARKER 1,605,912

ENGINE

Filed Dec. 29, 1922    13 Sheets-Sheet 4

WITNESSES

INVENTOR
SIMEON T. BARKER.
BY
ATTORNEYS

Nov. 9, 1926.　　　　S. T. BARKER　　　　1,605,912
ENGINE
Filed Dec. 29, 1922　　　13 Sheets-Sheet 8

WITNESSES

INVENTOR
SIMEON T. BARKER.
BY
ATTORNEYS

Nov. 9, 1926.

S. T. BARKER 1,605,912

ENGINE

Filed Dec. 29, 1922    13 Sheets-Sheet 10

Fig. 17.

SIMEON T. BARKER.
INVENTOR

WITNESSES

BY

ATTORNEYS

Nov. 9, 1926.  S. T. BARKER  1,605,912
ENGINE
Filed Dec. 29, 1922    13 Sheets-Sheet 13

WITNESSES
George G. Thyer

INVENTOR
Simeon T. Barker,
BY
ATTORNEYS

Patented Nov. 9, 1926.

1,605,912

UNITED STATES PATENT OFFICE.

SIMEON TOBIAS BARKER, OF CEBU, CEBU, PHILIPPINE ISLANDS.

ENGINE.

Application filed December 29, 1922. Serial No. 609,713.

My invention relates to improvements in engines, and it consists in the constructions, combinations and mode of operation herein described and claimed.

One of the objects of the invention is to embody a similar principle of construction and operation both in internal and external combustion engines.

Another object of the invention is to provide an internal combustion engine having blades which draw in and compress combustible charges in one rotor chamber, and similar but reversely positioned blades in a second rotor chamber against which the force of the ignited compressed charges is expended in producing rotary motion.

A further object of the invention is to provide a steam engine in which the major operating parts are like those of the internal combustion engine and operate on a similar principle, the exception being that there is no occasion for the compression of a combustible charge.

A further object of the invention is to use the major parts of the two engines described above, and with some modification produce either an air compressor or water motor.

Other objects and advantages will appear in the following specification, reference being had to the accompanying drawings, in which:

Figure 5:
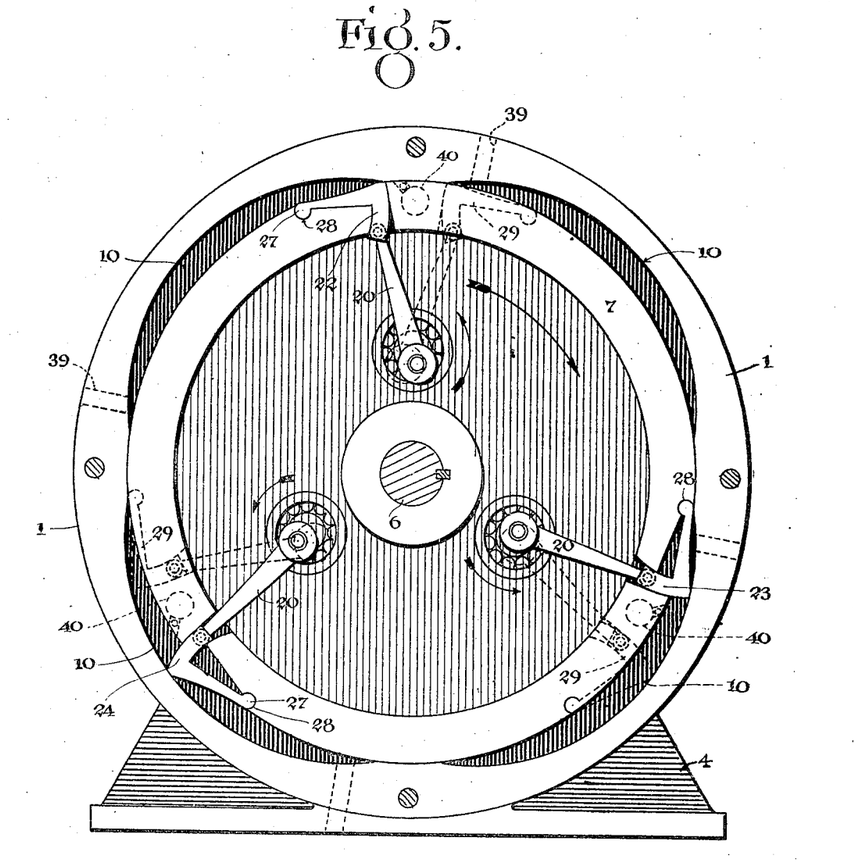
Fig. 5 is a section on the line 5—5 of Fig. 2.

The construction of the internal combustion engine comprises a stator 1 with end covers 2 and 3. No means for mounting the engine, other than the base 4 in Fig. 5, is shown. The drawings do not illustrate lubrication, cooling and ignition systems because these are details which have no direct bearing on the invention and can be worked out in actual practice to meet requirements. The covers 2 and 3 carry roller bearings 5 which support the shaft 6 and the rotors 7 and 8. The former is known as the intake and compression rotor, the latter as the expansion and exhaust rotor. The latter is wider than the former, and it follows that the expanison chambers 9 are wider than the compression chambers 10.

Figure 7:
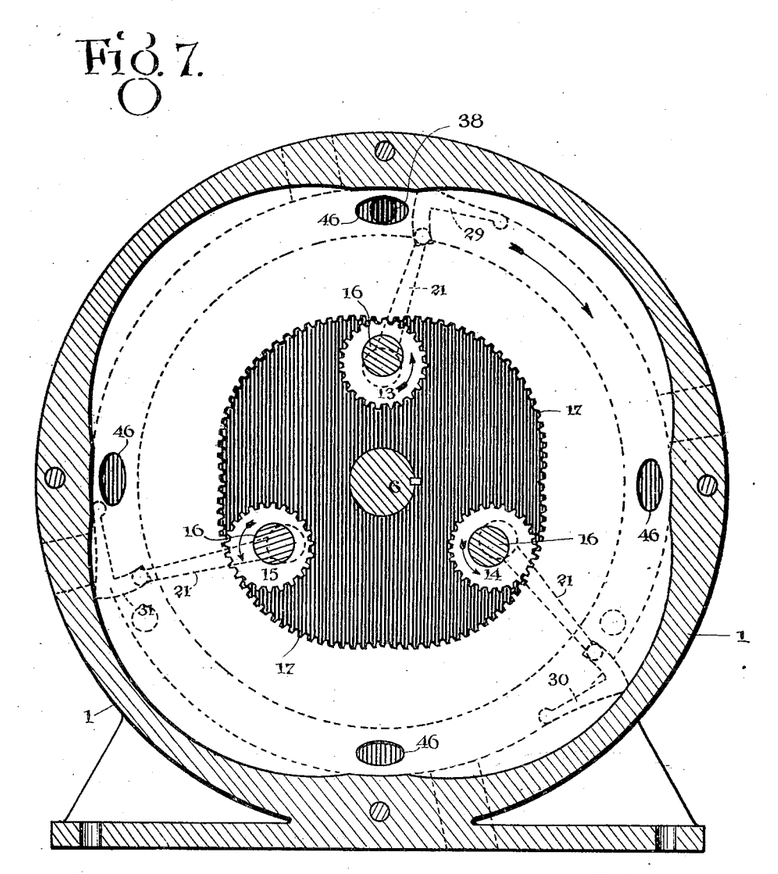
Fig. 7 is a section on the line 7—7 of Fig. 2.

A flange 11 divides the compression and expansion chambers. This flange is pendent from the stator casting or ring 1. It does not extend to the shaft 6 but has an opening 12 which is occupied by eccentric pinions 13, 14 and 15 (Fig. 7) of as many eccentric shafts 16. The pinions always mesh with a spur gear face 17 on the periphery of the flange 11.

There are four of the chambers 9 and 10 on each side of the flange 11. The flange constitutes a partition between the chambers and the rotors. The spur gear 17 is struck on a number of arcs so as to correspond in shape to the companion chambers 9 and 10. The gear 17 and pinions 13, 14 and 15 are accurately made so that the eccentric pinions follow the arcs of the gear 17, cause a turning of the crank pins 18 and 19 of each eccentric shaft 16 and a consequent reciprocation of the connecting rods 20 and 21, and of the blades to which they are connected.

Figures 2, 3:
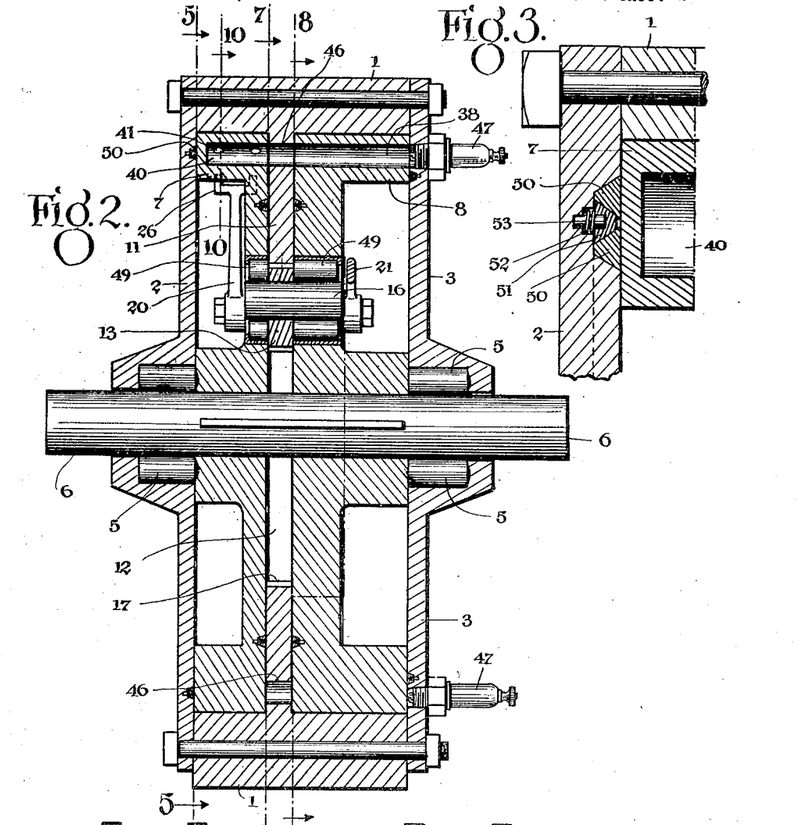
Fig. 2 is a vertical longitudinal section of the engine.
Fig. 3 is a detail section of a part of the engine, illustrating the arrangement of compression rings.
Figure 4:
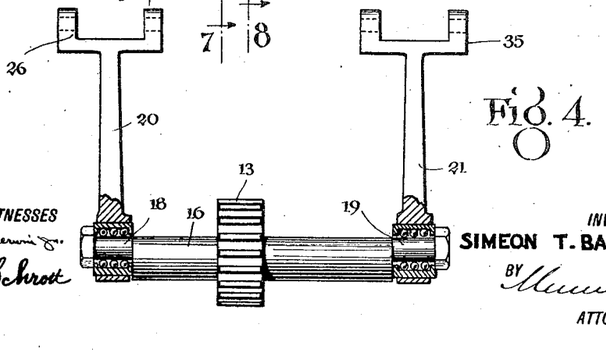
Fig. 4 is a detail view (partly in section) of one of the eccentric shafts and the connecting rods which operate the blades.
Figure 6:
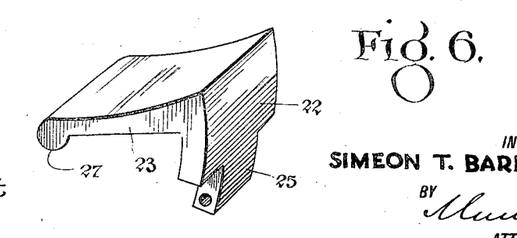
Fig. 6 is a detail perspective view of one of the intake and compression blades.

One set of connecting rods 20 works in the space at the left of the rotor 7 (Fig. 2). These rods are connected to intake and compression blades 22, 23 and 24. One of these blades is shown in detail in Fig. 6. It includes a lug 25 to which the bifurcated end 26 (Fig.4) of its actuating connecting rod 20 is joined. The blade has a rib 27 which occupies a correspondingly shaped socket 28 in the rotor 7, making provision for the rocking motion of the blades during reciprocation.

Figure 9:
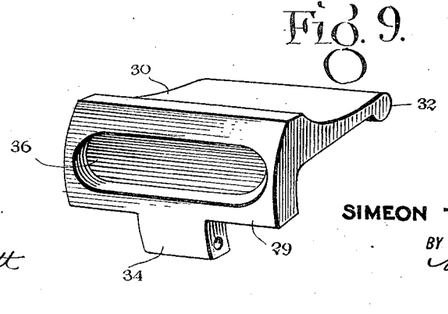
Fig. 9 is a detail perspective view of one of the expansion and exhaust blades which differs from the blade in Fig. 6 by having a gas passage on its face.

The other set of rods 21 occupies part of the space at the right of the rotor 8 (Fig. 2). These rods are connected to expansion and exhaust blades 29, 30 and 31. These too, have circular ribs 32 which occupy sockets 33 in order to provide for the rocking motion of the blades. One of the expansion blades is illustrated in detail in Fig. 9. It has a lug 34 to which the bifurcated end 35 (Fig. 4) of a companion rod 21 is joined.

The blade 29 differs from the blade 22 (Fig. 6) by having a gas passage 36 on its face. The purpose of this passage is to let the gas out of the port 37 after its mission has taken place in the chamber 38. The gas passes into the adjacent expansion chamber 9. The left wall of the chamber constitutes the abutment for the expanding gas.

Close contact between the heel (highest outermost point) of each blade and adjacent compression or expansion chamber surface is maintained by the operation of the eccentric pinions 13, 14 and 15 around the eccentric spur gear 17. This is true for the blades on each side, since the gear 17 functions in common for both the compression and expansion blades. The sets of blades 22 etc. and 29 etc. respectively of the compression and expansion sides are turned reversely to each other. This is illustrated by the full and dotted line positions in Fig. 5, or can be seen by comparing Figs. 5 and 8. The reason for this arrangement is obvious enough.

The blades 22 etc. draw in and compress charges of air and gas, while the blades 29 etc. receive the force of the ignited compressed charges and so are instrumental in turning the engine in the clockwise direction indicated by the arrows. Gas is drawn in at the base of each chamber 10 through ports 39 as a blade advances in the clockwise direction in that chamber. Each port 39 must be equipped with a back check valve to prevent the gas from escaping while the succeeding blade advances to compress the charge.

For example; the blade 22 (Figs. 1 and 5) draws a charge of gas through the port 39 into the chamber 10 until the heels of the blade 22 depart from the uppermost extremity of the chamber. The gas now in the chamber 10 must be withheld from escaping at the port 39, while the succeeding blade 24 advances and reaches the chamber 10 for the compression of the gas. The gas is compressed into a compression chamber 40. There is one of these for each blade 22 etc. The compression chamber goes with the blade since both are parts of the rotor 7.

Figure 8:
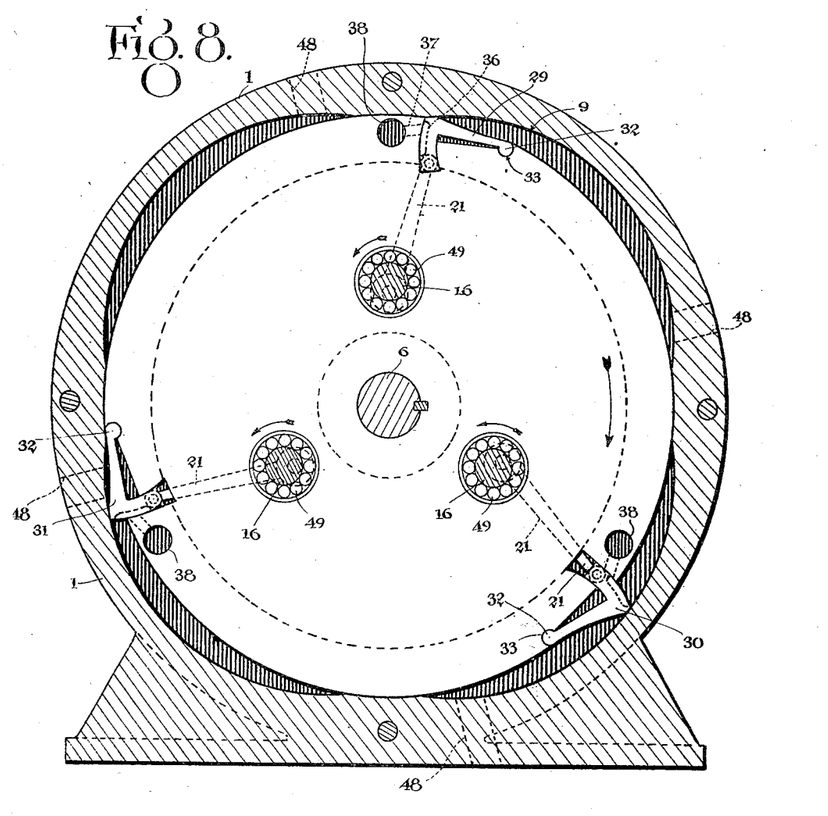
Fig. 8 is a section on the line 8—8 of Fig. 2.

Similarly, there is one of the ignition chambers 38 for each of the blades 29 etc. (Fig. 8). The ignition chambers go with the blades 29 etc. since both are carried by the expansion rotor 8. Returning to the intake and compression side, the blades 22 etc. force the gas in the chambers 10 into the compression chambers 40 as they pass through and under the arches of the chambers 10. This takes place through back check valves 41.

Figure 10:
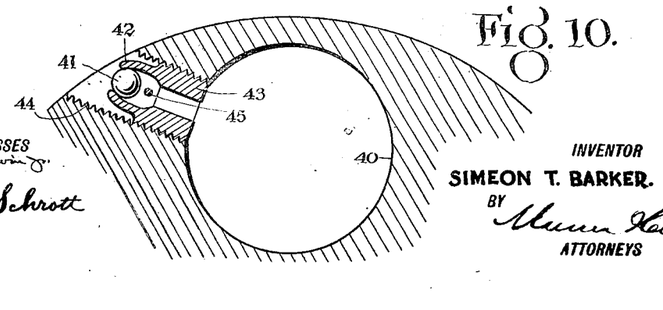
Fig. 10 is a detail section on the line 10—10 of Fig. 2, illustrating one of the check valves of a compression chamber.

The purpose of the valves 41 is to keep the gas in the adjacent chamber 40 after it has once been compressed therein. Fig. 10 illustrates one of these valves in detail. It comprises a ball in a cage 42 which includes a plug 43. The plug is screwed into a threaded bore 44 which extends from the periphery of the rotor 7 to the compression chamber 40. The pressure on the inside of the chamber 40 holds the ball 41 out, as shown. A pin 45 limits the inward movement of the ball when gas is forced in by the blade 22.

Compression of gas into the chambers 40 continues until a by-pass 46 is reached. The by-passes are formed in the flange or partition 11. The chambers 40 and 38 are in longitudinal alinement, and when a by-pass 46 is reached the compressed gas passes into the chamber 38 where it is ignited by a spark from the plug 47 and passes through the port 37 and passage 36 into the adjacent chamber 9 where expansion takes place until the blade 29 reaches the exhaust port 48. There is one exhaust port for each expansion chamber 9, and the exhaust port is located at the right extremity so that the full benefit of the expanding charge may be derived before it is let out to atmosphere.

Figure 1:
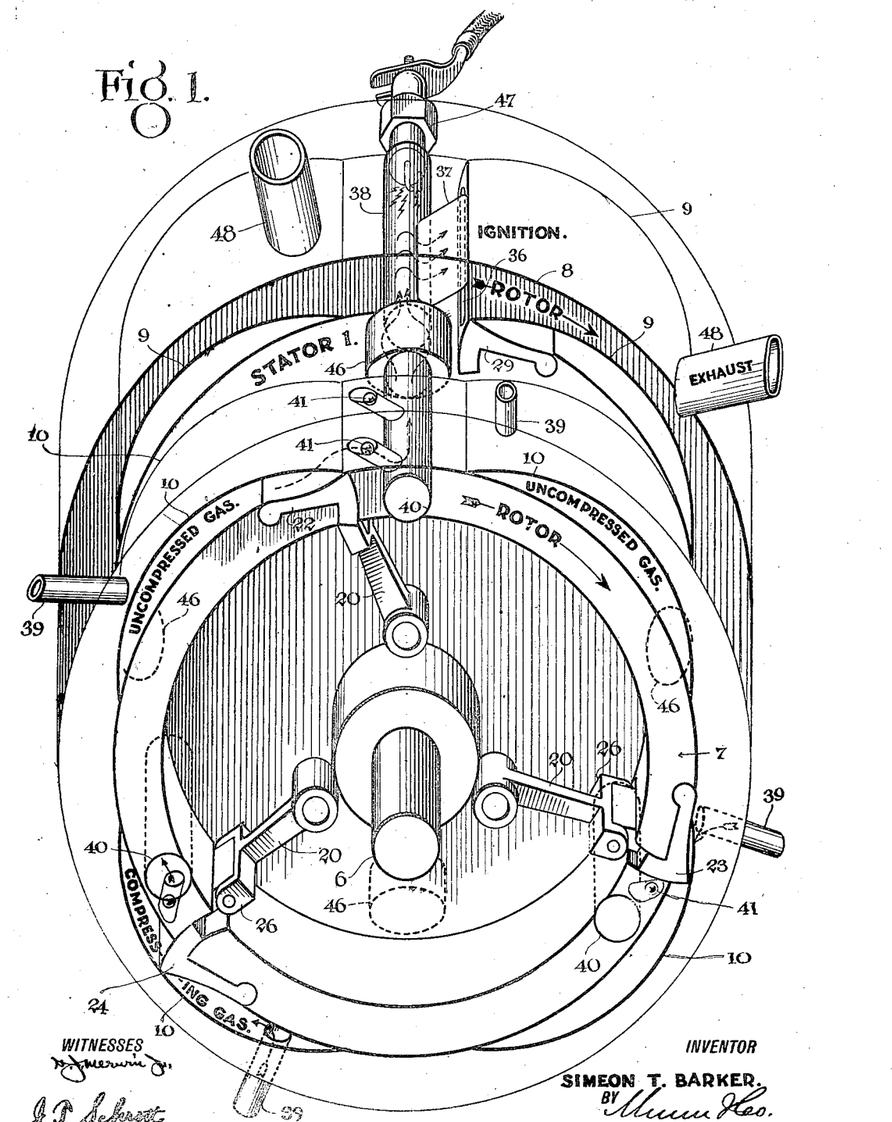
Fig. 1 is a diagrammatic perspective view (in phantom) clearly illustrating the parts of the rotary internal combustion engine.

There are four by-passes 46; one at the head of each intake and compression chamber 10 in the direction of rotation. The engine fires on quarters, and this is readily seen in Fig. 5. The compressed charge in the chamber 38 (Fig. 8) on the top center is being ignited (Fig. 1). The blade 24 is compressing a charge into the chamber 40 which will become ignited in the chamber 38 at the left center when the by-pass 40 at that place is reached. The blade 24 is compressing a charge which will become ignited on the bottom center, and the charge of gas now in the upper right chamber 10 will be compressed by the blade 22 and ignited on the right center.

This rapid succession of ignitions or explosions at equally distributed points similarizes the engine to a turbine. The obvious advantage of driving the engine shaft by a rapid succession of blows from equally distributed points is the uniform application of the power and a uniform driving torque. Attention is directed to Figs. 2 and 3. The eccentric shaft 16 is supported by roller bearings 49 in each case. These bearings are contained by suitable cases which in turn are carried by the rotors 7 and 8 respectively. The shaft runs on the bearings as the pinion 13 follows the eccentric spur gear 17.

Compression rings 50 (Fig. 3) are intended to prevent the escape of gas around the face of the rotor 7. The rings 50 are conical in cross section. A ring 51 fits between the compression rings, and a spring 52 causes them to expand and bear against the adjacent rotor surface. The expander ring 51 carries a number of dowels 53 which not only carry the springs but also fit in recesses in the cover so as to hold the packing ring structure in place.

The operation of the internal combustion engine may be briefly reviewed to advantage. The rotors 7 and 8 move in the clockwise direction indicated by the arrows in the drawings. The blades 22, 23 and 24 of the rotor 7 at once draw in a fresh charge of air and gas and compress a charge previously drawn in by a preceding blade. This occurs in each compression chamber 10 every time it is entered by a blade. For example, the blade 22 compresses a charge which was previously drawn into the chamber 10 by the blade 23, and while compressing this charge, draws in a new charge of air and gas at the ports 39, which is subsequently compressed by the blade 24. The charge compressed by the blade 22 passes the valve 41 and is pocketed in the compression chamber 40 until the by-pass (upper center) 46 is reached. The compressed charge then passes across into the ignition chamber 38 of the expansion rotor 8 where it is ignited by a spark from the plug 47. The expanding gas escapes at the port 37 and expends its energy against the face of the adjacent expansion blade 29. The wall of the chamber 9 constitutes the abutment for the gas. The passage 36 lets the gas out of the ignition chamber 38 and by the port 37. The blade 29 also scavenges the chamber 9 as it is moved in the clockwise direction under the influence of the expanding gas against the face.

It is easy to calculate the number of explosions in one revolution of the shaft 6 to be twelve. An explosion occurs for each blade at each quarter of the circle of revolution. It is largely a matter of mechanical skill to increase the number of blades so that the number of explosions per revolution of the shaft may be increased.

Figure 13:
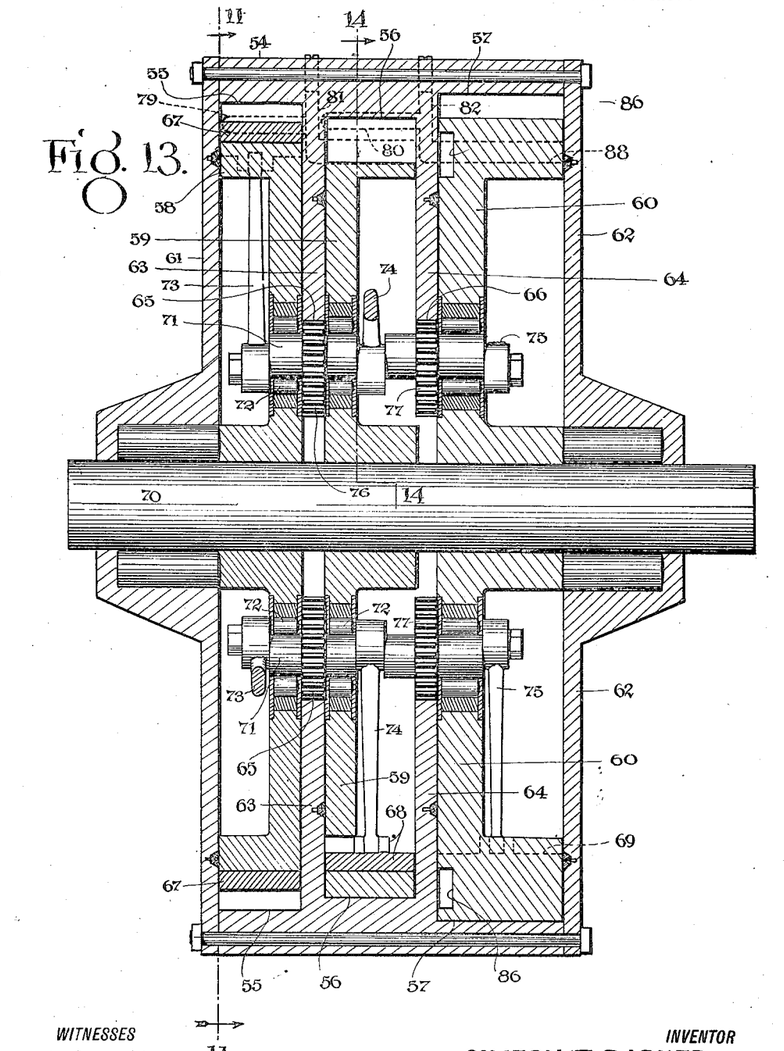
Fig. 13 is a central longitudinal section of the steam engine.
Figure 14:
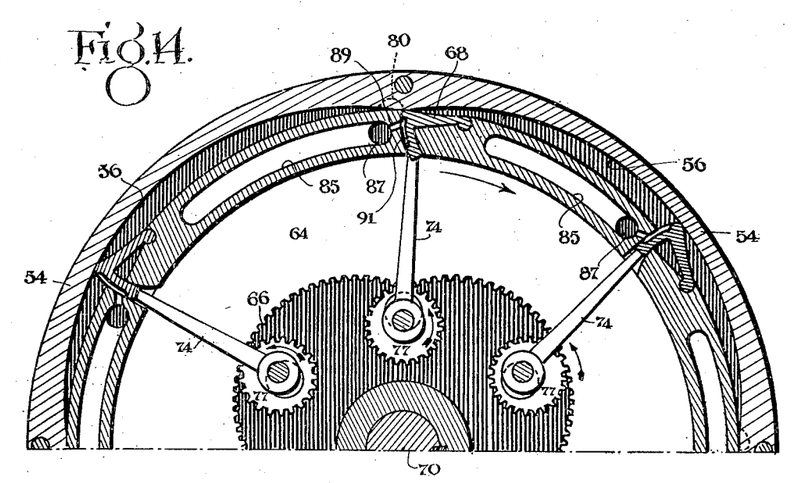
Fig. 14 is a section taken substantially on the line 14—14 of Fig. 13, and illustrating the blades, etc. of the intermediate expansion chamber.

The construction of the steam engine is like that of the internal combustion engine in so far as the shapes of the blades, rotors, expansion chambers, eccentric pinions, eccentric spur gear and other major parts are concerned. The stator 54 (Fig. 13) now has three expansion chambers 55, 56 and 57 in which the rotors 58, 59 and 60 operate at high, intermediate and low pressures respectively. These chambers are defined by the covers 61 and 62, and the dividing flanges 63 and 64 which have eccentric spur gears 65 and 66 on the peripheries as in the internal combustion engine.

Figure 11:
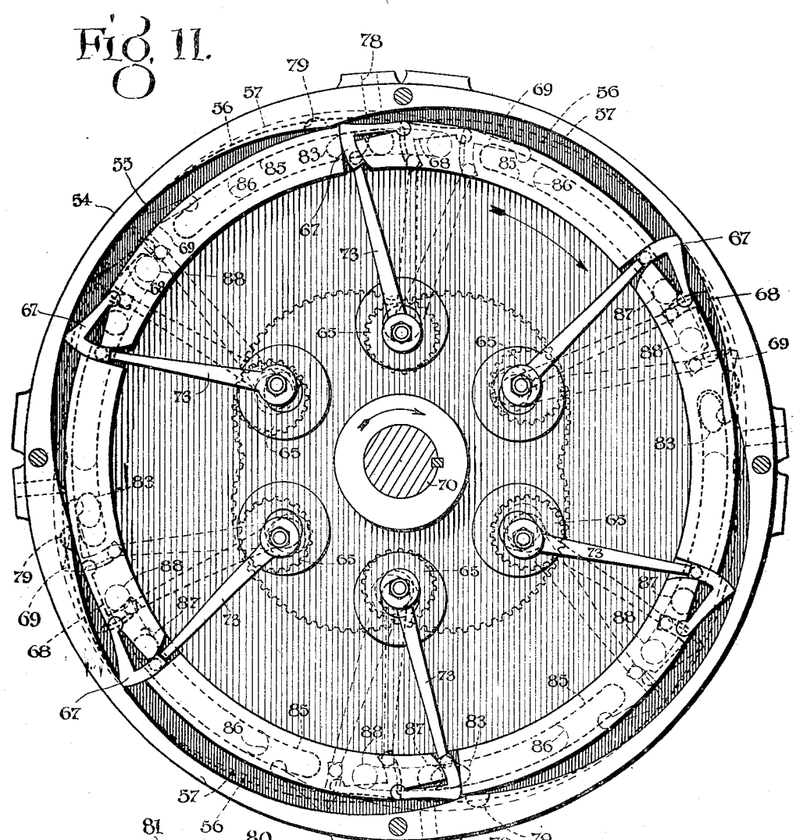
Fig. 11 is a front elevation (cover removed) of the steam engine or turbine.

The number of blades in each expansion chamber 55 etc. has been increased to six. All of the blades occupy the same relative positions (Fig. 11). The set of blades of the chambers 55, 56 and 57 are collectively designated 67, 68 and 69. The passage of a single charge of steam can be traced in diagrammatic Fig. 16. The expansion of this charge of steam produces a three-quarters revolution of the shaft 70. In other words, a charge of steam is active in turning the shaft through three-quarters of a revolution.

An eccentric shaft 71 journalled on roller bearings 72 in each of the three rotors, carries rods 73, 74 and 75 to rock the blades 67, 68 and 69 respectively. These rods are actuated by crank pins which are turned out of the eccentric shaft. This shaft also carries eccentric pinions 76 and 77. These mesh with the eccentric spur gears 65 and 66, the former of which is shown in dotted lines in Fig. 11.

The expansion chambers 55, 56 and 57 consist of a plurality of crescent-shaped recesses in the stator 54. Steam is admitted at boiler pressure by way of ports 78 at the approach of each of the high pressure chambers 55. A blade 67 which may happen to be in a chamber 55 which is receiving steam at boiler pressure, is driven throughout the length of the chamber 55. The point of cut-off of the live steam occurs when a blade has traversed approximately three-fourths of the length of a chamber 55. The cut-off is produced by the succeeding blade. Expansion of the steam commences at the point of cut-off.

A port 79 lets this steam out of the chamber 55 when it is uncovered by a blade 67. There is a port 79 at the head (in the direction of rotation) of each of the chambers 55. There is a similar port 80 at the head of each of the chambers 56 in the stage of intermediate expansion.

Each port 79 and 80 ends in a bore 81 and 82 respectively. The bores end in by-passes 83 and 84 in the flanges or partitions 63 and 64, and offer communication between the ports 79 and 80 and grooves 85 and 86 of the adjacent intermediate and low pressure rotors 59 and 60. There is no communication between the ports 79 and 80.

Figure 12:
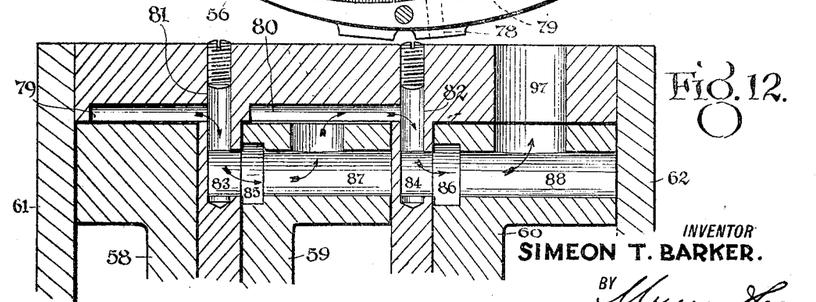
Fig. 12 is a detail sectional view of a part of the steam engine, illustrating a development of the various ports, by-passes, steam chambers and expansion chambers.
Figure 15:
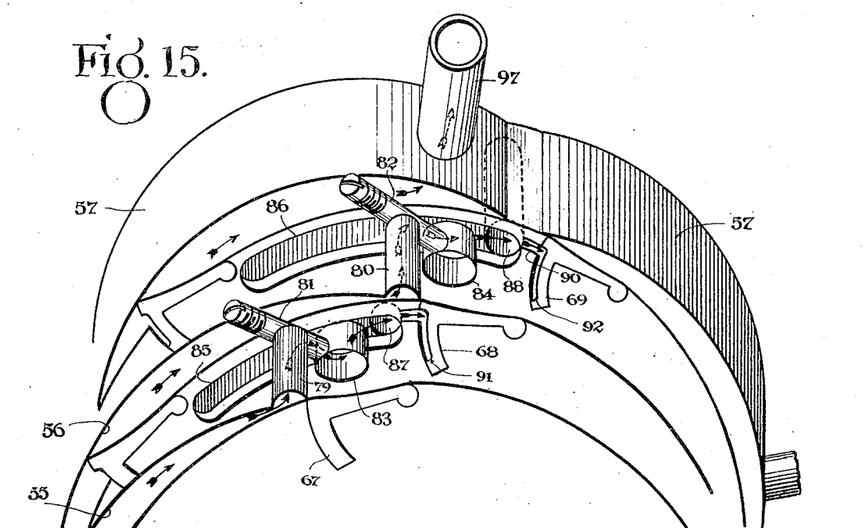
Fig. 15 is a diagrammatic perspective view (in phantom) illustrating the arrangement of a set of contiguous ports, by-passes and steam chambers.

The grooves 85 and 86 occur only in the intermediate and low pressure rotors 59 and 60. This is to be seen in Figs. 15 and 16, and also in Fig. 12 which is a sectional development intended to illustrate the transverse relationship of the various ports, etc. There is one groove for each of the blades 68 and 69. The purpose of the grooves is to lengthen the period of steam communication with the adjacent by-pass. Each groove terminates in a steam expansion chamber; 87 at the head of the groove 85 and 88 at the head of the groove 86.

These expansion chambers have communication through ports 89 and 90 with passages 91 and 92 of the blades 68 and 69, so that when the heel (outermost point) of a blade enters an adjacent expansion chamber, the steam too may enter this chamber and expend its force against the face of the blade and so turn the engine shaft. The wall of the expansion chamber constitutes the abutment for the steam.

*The operation of the steam engine.*—The blades 67, 68 and 69 are arranged in sets of three. Each eccentric shaft 71 is the common actuator for all of the blades of a set. The blades are set in advance of each other, and so are the expansion chambers 56 and 57 and the series of grooves, in order to correspond. All other associated parts are set in advance of each other, for example, the ports 80 in respect to the ports 79. This is necessary in order to secure the proper registration of the grooves and by-passes when the transfer of steam occurs.

Figure 16:
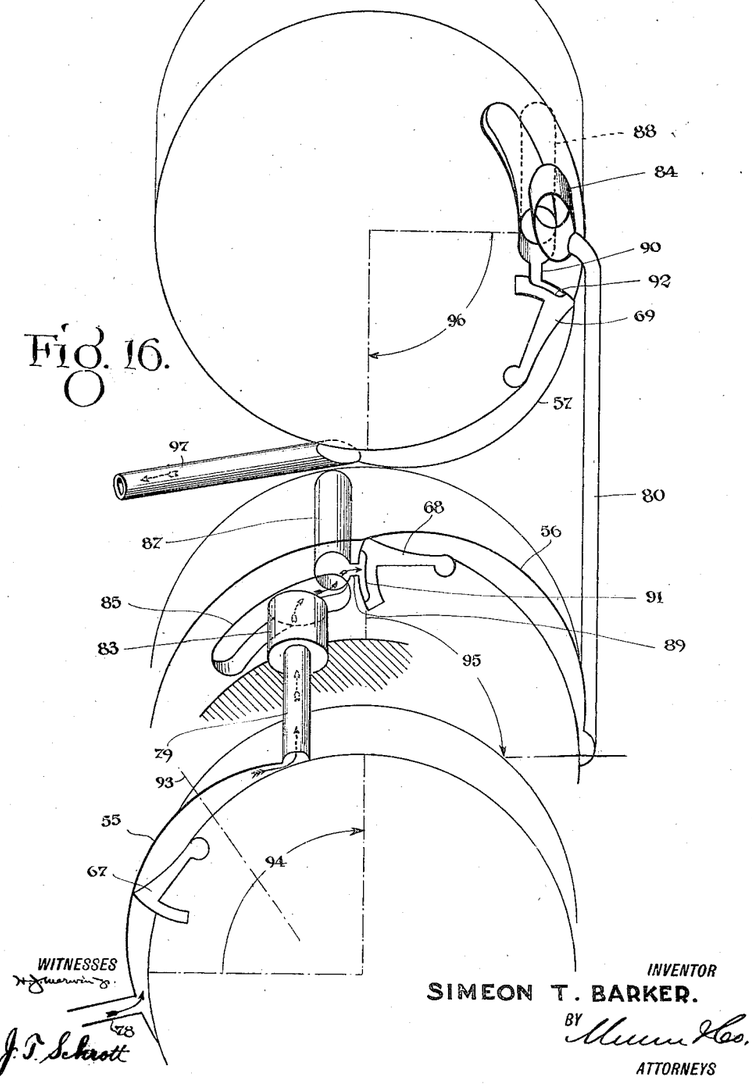
Fig. 16 is a diagrammatic perspective view illustrating the complete path of one charge of steam which expands through three-quarters of a revolution of the engine before exhausting.

Consider the diagram in Fig. 16. The relative positions of the blades 67, 68 and 69 are shown incorrectly but with the purpose to illustrate what occurs in one cycle of operation. Steam enters the port 78 at boiler pressure and commences driving the blade 67 as soon as the blade uncovers the port. The point of cut-off occurs approximately on the line 93 and is accomplished by a following blade entering the high pressure chamber 55 and covering the steam port 78 so far as the blade 67 is concerned. The expansion of steam continues through the rest of the first quarter of revolution 94.

As soon as the heel of the blade 67 uncovers the edge of the port 79, the steam passes over into the intermediate expansion stage, entering the expansion chamber 87 by way of the by-pass 83 and groove 85, both of which have come into proper registration by this time. The length of the groove 85 prolongs the period of communication with the high pressure chamber 55, so that there may be a complete evacuation of the high pressure steam.

It must be borne in mind that the chambers 55, 56 and 57, the ports 79 and 80, bores 81 and 82 and the by-passes 83 and 84 are stationary since they are formed in parts of the stator 54. But the expansion chambers 87 and 88 at the grooves 85 and 86 move since they are formed in the intermediate and low pressure rotors 59 and 60.

Consider the intermediate expansion chamber 87 to be full of steam. The blade 69 is at the beginning of its quarter of revolution 95. The heel of the blade is about to enter the intermediate expansion chamber 56, and when it does, the steam will cross the port 89 and passage 91 into the chamber and so drive the blade 68 (consequently the rotor 59) through the quarter 95. The point of cut-off of steam from the chamber 55 occurs when the left end of the groove 85 passes the right extremity of the by-pass 83.

The expansion of steam in the chamber 56 occurs until the heel of the blade 68 uncovers the port 80. This is not the particular port 80 at the top center in Fig. 15, but is a similar port approximately 90 degrees from the top center in the direction of rotation. As soon as this port is uncovered, steam passes across into the low pressure expansion stage, entering the chamber 88 by way of the groove 86 and by-pass 84, both of which come into registration approximately at the time when the blade 69 is about to enter the chamber 57.

At this time, the blade 69 is approximately at the beginning of the third and last quarter 96 of revolution, and the expansion of the charge of steam originally let in at the port 78, terminates when the blade 69 uncovers the exhaust port 97. A similar cycle of operation occurs for each of the blades.

Figure 18:
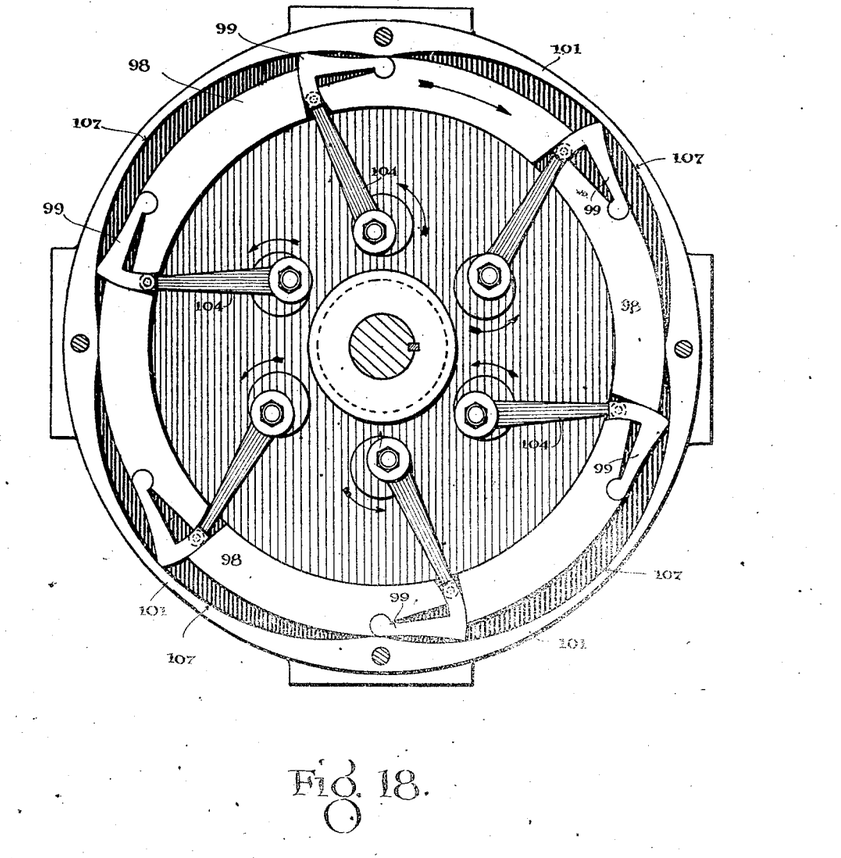
Fig. 18 is a section on the line 18—18 of Fig. 17.
Figure 19:
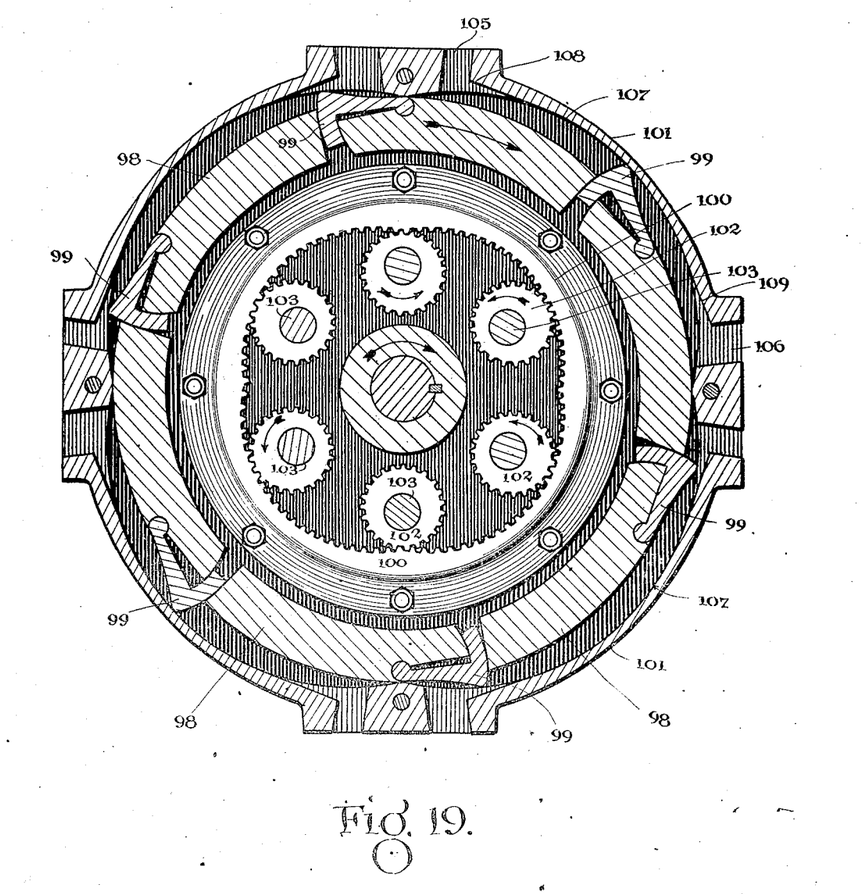
Fig. 19 is a section on the line 19—19 of Fig. 17.

The construction of the water motor is of a considerably simplified construction in that it has only one rotor 98 and one set of blades 99. These blades are six in number, as shown in Figs. 18 and 19 and in construction are identical with the compression blades 22 etc. of the internal combustion engine and the high pressure blades of the steam engine. In practice, the blades 99 may be made larger than shown in Fig. 18 to better accomplish the purpose of the water motor.

Figure 17:
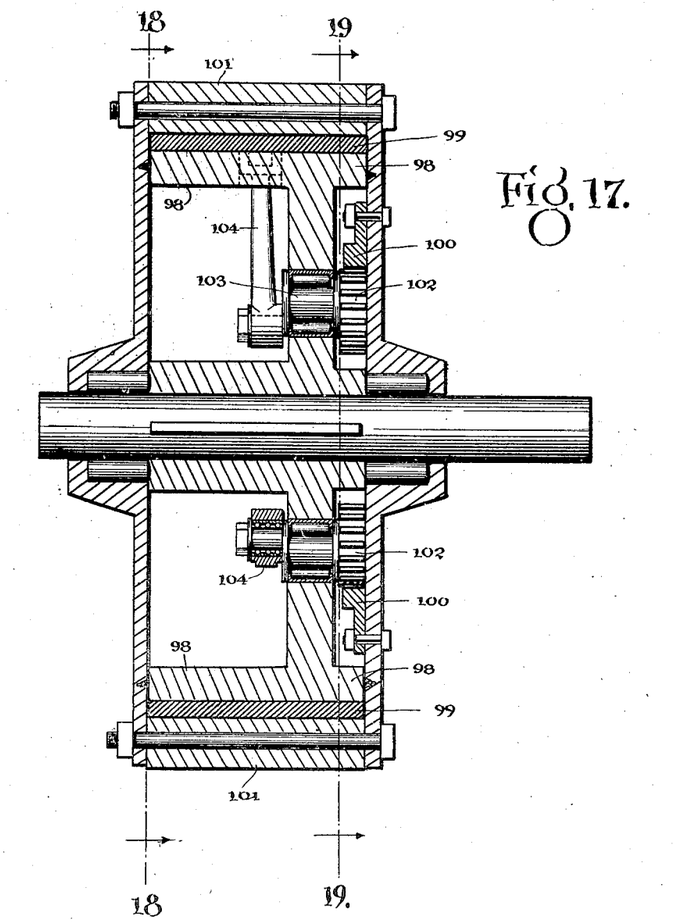
Fig. 17 is a longitudinal section of the arrangement of the engine as a water motor.

The eccentric gear 100 consists of a ring which is bolted to the right cover (Fig. 17) of the stator 101. The eccentric pinions 102 mesh with the eccentric gear, and actuate the blades through the eccentric shafts 103 and connecting rods 104 precisely as in the foregoing modifications.

Water enters at the inlets 105 and discharges at the openings 106. Each expansion chamber 107 includes ports 108 and 109 at the inlet and outlet ends respectively. The force of a stream of water at an inlet 105 is imposed on a blade 99 while it traverses the entire length of an expansion chamber, and it is for the purpose of insuring the continuation of the driving force against a blade until it reaches an outlet 106 that the ports 108 are provided.

In Fig. 19 the lowermost blade 99 has uncovered the port 109 so that the discharge of water from the chamber 107 has begun. But it is also to be observed that the blade 99 next succeeding has not yet closed the inlet port 108 so that the pressure of water which moved the foregoing blade to the bottom center is still present in the chamber 107. The part of cut-off occurs when the second blade from the bottom toward the right crosses the port 108, whereupon the force of the stream of water is imposed on said blade and this blade aids in expelling the spent charge from the chamber beneath it. The engine may be converted into a multiple stage air compressor by employing the steam engine structure in Fig. 11. The direction of rotation of the rotors must be reversed. Air will be drawn in at what is now the exhaust port 97 of the low pressure stage 57.

The air will be compressed in each of the stages in order 57, 56 and 55 and by the blades 69, 68 and 67. The various grooves 86 and 85, by-passes 84 and 83 and ports 80 and 79 will operate to pass the air from one stage to the next until it is finally discharged at high pressure at what are now the steam inlet ports 78 in Figs. 11 and 16. It will be necessary to have a check valve at each of the outlets. Power is applied directly to the shaft 70.

Figures 20, 21:
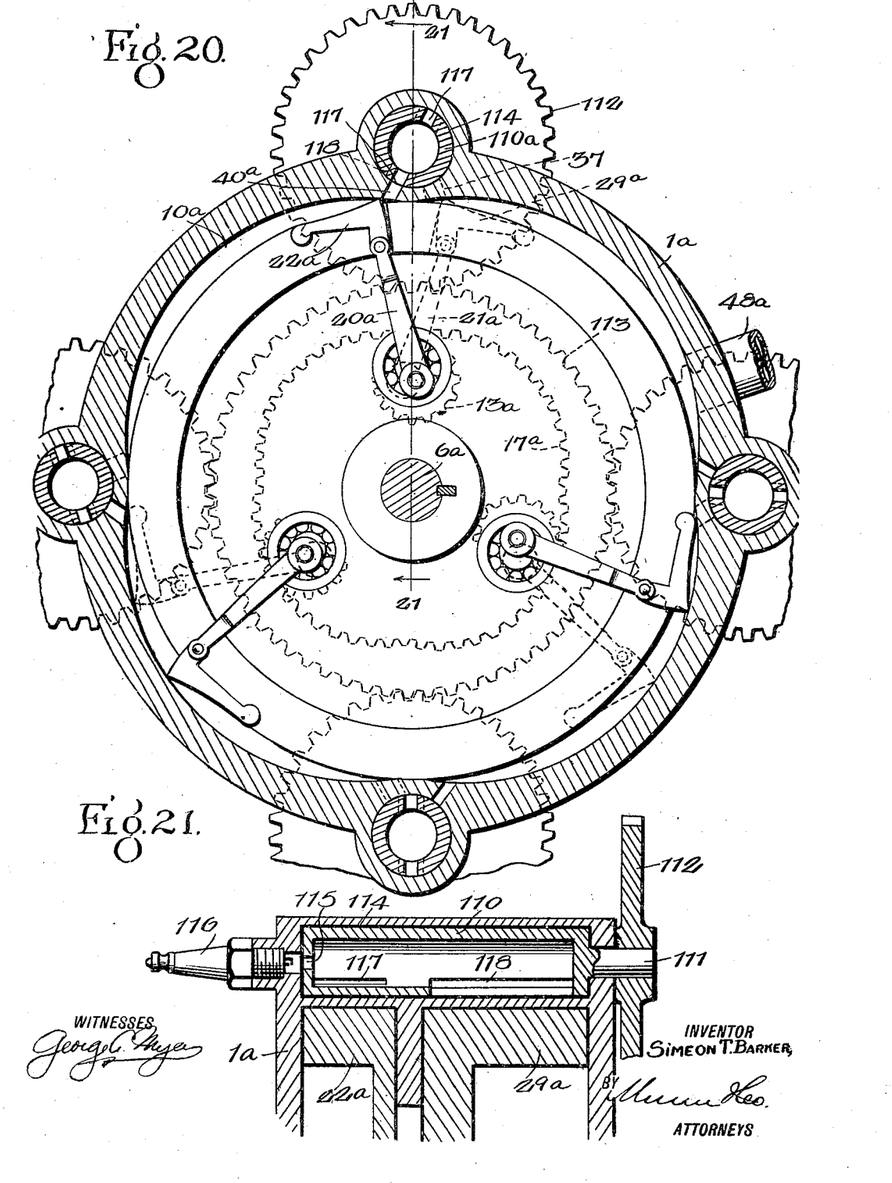
Fig. 20 is a view somewhat on the order of Fig. 5 illustrating a modification of the internal combustion engine wherein the combustion chambers rotate.
Fig. 21 is a detail section taken substantially on the line 21—21 of Fig. 20.

The modification in Figs. 20 and 21 discloses an engine very much on the order of the engine in Figs. 1 to 8, the principal departure being the provision of rotary combustion chambers, 110, each of which has a shaft 111 (Fig. 21) with a pinion 112 to be driven by a main gear 113 on the shaft $6^a$.

In practice the ratio of the gears 112 and 113 is such as to revolve the combustion chambers 110 about one and one-half times to one revolution of the main shaft. As the construction and operation of all of the rotary combustion chambers is alike the description of one will suffice for all.

The stator $1^a$ has a transverse enlargement formed into the cylinder 114 for the occupancy of the chamber 110. This is nothing more than a hollow cylinder with an opening 115 at one end so that a spark from the plug 115 may ignite the gas, a pair of intake or compression ports 117 and a pair of exhaust or expansion ports 118. Take the position at the top of Figure 20: The blade $22^a$ has reached a position where a charge of gas in the chamber $10^a$ has been fully compressed.

When such point is reached one of the intake ports 117 comes into registration with an intake passage $14^a$ and the compressed charge of gas enters the chamber 110. A spark from the plug 116 ignites the charge. As soon as the port 117 and passage $14^a$ move out of registration one of the exhaust or expansion ports 118 moves into registration with the exhaust passage $37^a$ and is thereby directed against and adjacent to the blade $29^a$ so that rotary motion is imparted to the shaft $6^a$. The expansion chamber 110 forms the abutment for the gas until the exhaust port $48^a$ is reached.

Provision is made of a spur gear $17^a$ (as in the first form of the invention) with which a pinion $13^a$ meshes so as to actuate the connecting rods $20^a$ and $21^a$ for the oscillation of the compression and working blades $22^a$ and $29^a$. It is to be observed by comparing Figures 20 and 21 with Figure 1 that the rotary expansion chamber 110 performs the same function in respect to the engine as do the compression and expansion chambers 14 and 38. The by-pass 46 is omitted but again the combustion chamber 110 takes the place of the by-pass in transferring the working fluid from the compression side (7) to the expansion side 9.

While the construction and arrangement of the improved internal combustion engine as herein described and claimed is that of the generally preferred form, obviously modifications and changes may be made without departing from the spirit of the invention or the scope of the claims.

I claim:—

1. An engine comprising adjacent rotors, a blade carried by each, a shaft journalled on the rotors and having eccentric ends, connections joining the blades and said eccentric ends, a partition between the rotors having a gear surface, and a pinion on the shaft between the rotors meshing with the gear to revolve the shaft as the rotors turn.

2. An engine having a stator with eccentric gas chambers, a fixed gear having corresponding eccentric portions following the contour of the chambers, a rotor, a blade carried by the rotor, a shaft journalled on the rotor having a crank with a connection to the blade, and a pinion eccentrically mounted on the shaft to agree with the eccentric-gear portions and keep in mesh with said gear portions and cause the blade to follow the contour of the chambers.

3. An engine comprising a stator having a partition provided with a by-pass, a cover plate on each end of the stator, a rotor on one side of the partition with a pocket extending into but not through the rotor and adapted to register with the by-pass, a rotor on the other side of the partition with a pocket extending completely through but closed by the adjacent cover plate, and a spark plug inserted in said cover registering with said through pocket when both pockets register with the by-pass.

4. An engine comprising adjacent rotors each having spaces leaving a circular peripheral rim on each rotor, a blade mounted in the rim of each rotor, a shaft journaled on the rotors, and having eccentric ends extending into the adjacent spaces, connections between the ends and the blades, a stationary member having an eccentric gear, and an eccentric pinion on the shaft meshing with said gear causing the blades to oscillate in respect to the rim.

5. An engine comprising a stator having a concavity, a rotor in the stator having a web and a circular peripheral rim completing a chamber at the concavity, a fixed gear shaped like the interior of the stator and concavity, a shaft journalled on the web and having an eccentric pin, and an eccentric pinion on the shaft meshing with the gear causing the blade to closely follow the internal contour of the stator.

SIMEON TOBIAS BARKER.